Figure 1:
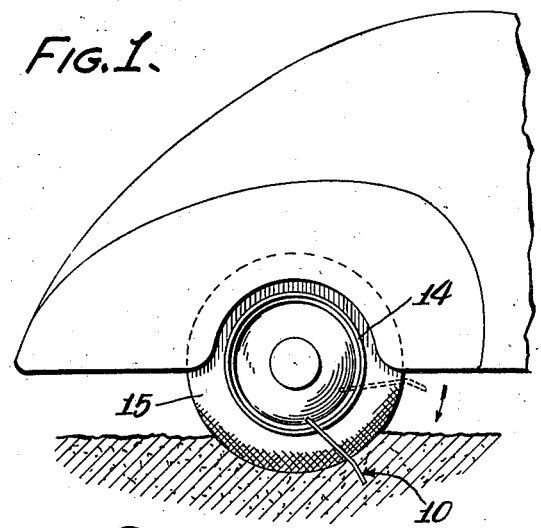

Sept. 12, 1950     H. R. ROGANT     2,522,132
TRACTION LUG
Filed Jan. 8, 1948

INVENTOR.
HUMBERT R. ROGANT
BY
Michael Williams
INVENTOR

Patented Sept. 12, 1950

2,522,132

UNITED STATES PATENT OFFICE 2,522,132

TRACTION LUG

Humbert R. Rogant, Willoughby, Ohio

Application January 8, 1948, Serial No. 1,258

3 Claims. (Cl. 152—228)

My invention relates to traction lugs for vehicles, and the principal object of my invention is to provide new and improved lugs of this character.

Traction lugs, in order to be commercially successful, must be easily applied and removed, since they are ordinarily used only when the vehicle is stuck in mud, snow, or the like. Under such ordinary conditions of usage, the operator is not favorably disposed to undertake the time and patience involved in properly mounting the lugs on a wheel or wheels.

After usage, since the lugs should not be used to travel over ordinary roads, it is desirable that they be removed as soon as the vehicle is dislodged. However, easy disassembly is essential, since the lugs, wheel, and surrounding road area usually are covered with mud or the like.

The prior art constructions have not been commercially accepted, because in each case a great amount of time and effort was required to assemble and disassemble the lugs with respect to the wheels. The drawbacks of the prior art constructions are entirely overcome through use of my invention, since the lugs may be assembled with or removed from a wheel in short time and with little effort and instruction.

Figure 2:
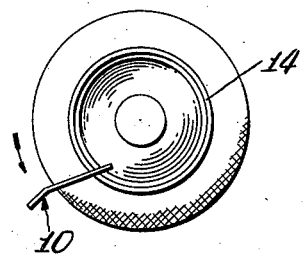
Figure 3:
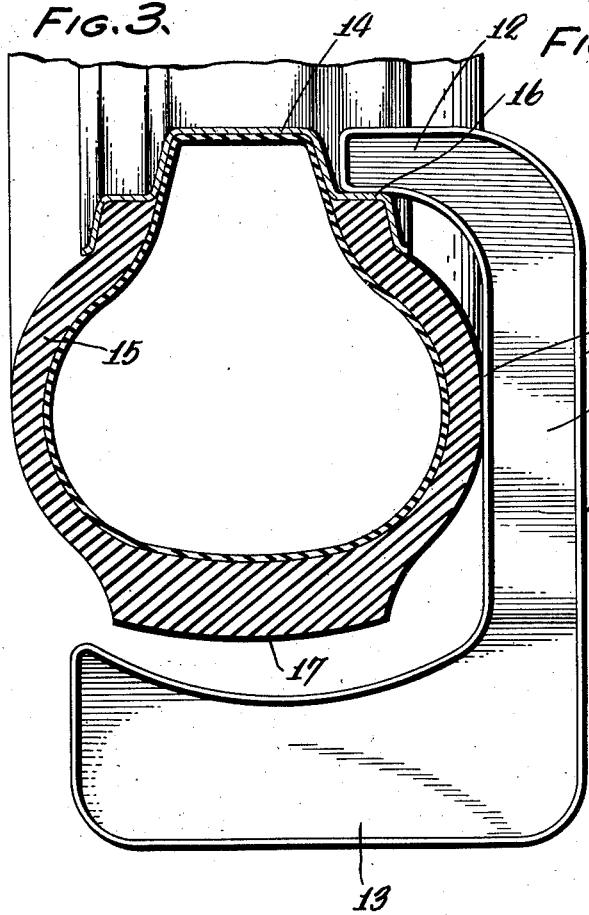
Figure 4:
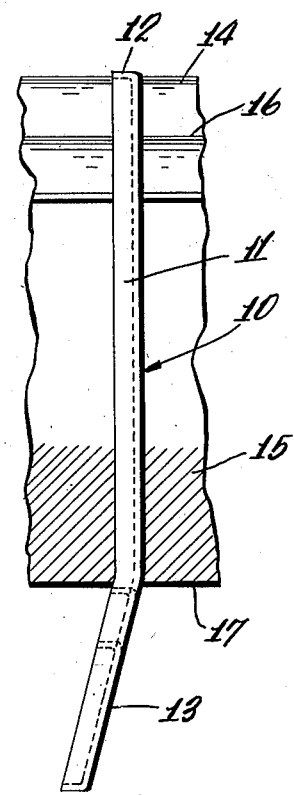

In the drawing accompanying this specification and forming a part of this application, there is shown, for purposes of illustration, an embodiment which my invention may assume, and in these drawings:

Figure 1 is a broken elevational view showing an embodiment of the invention as applied to the wheel of an automotive vehicle, Figure 2 is an elevational view showing an embodiment of opposite hand applied to an automotive wheel, Figure 3 is an enlarged cross-sectional view through an automotive wheel, showing a method of assembling the traction lug, and Figure 4 is a broken side elevational view of the construction shown in Figure 3.

Referring particularly to Figures 3 and 4 of the drawings, the traction lug illustrating the presently preferred embodiment of my invention comprises a body 10, herein shown formed as a stamping and of one-piece construction, although it will be appreciated that the body may be formed in any other suitable manner and fabricated from more than one part.

The body 10 is generally U-shaped in plan, forming a bight 11 and legs 12 and 13. In the illustrated form, the body is designed for use with an automotive wheel comprising a drop-center rim 14 and a tire 15, and accordingly, the leg 12 is formed shorter than the leg 13, and is adapted to bear against the exposed peripheral surface of the bead-receiving portion 16 of the rim. The leg 13 is of substantial size, and is adapted to cooperate with the tread portion 17 of the tire. A stiffening flange 18 is preferably formed completely around the lug, to provide greater strength. In the present embodiment, the leg 13 is offset angularly from the plane including the bight 11 and leg 12, as best seen in Figure 4.

As best seen in Figures 3 and 4, the opening defined by the legs 12 and 13 provides for easy assembly of the lug transversely and from one side only of the wheel, this opening being of sufficient size to freely permit assembly of the lug when its major portion is substantially radially disposed with respect to the wheel.

After the lug is positioned radially of the wheel, it is tilted from radial position, as shown in dotted lines in Figure 1, so that portions of the legs 12 and 13 grip radially offset portions of the bead-receiving portion 16 and the tire tread 17, so as to hold the lug in position for operation. In some cases, it may be found that this tilting action is not necessary.

In operation, and assuming the vehicle wheel is rotating in the direction of the arrow in Figure 1, the outer extremity of the leg 13 engages the road surface, so as to further increase the binding action between the legs 12, 13, and the parts of the wheel. As the wheel rotates, the lug firmly engages with the soft road surface, to provide enough traction to dislodge the vehicle from its position in the soft road surface.

In the present form, the lug is so designed that it will automatically drop from the wheel shortly after it has traversed the soft road area, although it will be appreciated that the opening formed by the legs 12, 13 may be so proportioned relative to the engaged spaced radial surfaces of the wheel that the lug will remain on the wheel and rotate to again engage the road surface. The narrow width of the bight 11 permits such design without danger of damage to the fender of the vehicle.

In the case, as in the embodiment disclosed, where the leg 13 is offset angularly with respect to the plane including the bight 11 and leg 12, it is preferable to provide the lugs in sets of opposite hand, to provide for rotation of the wheel in an opposite direction, as shown in Figure 2, or for assembly of the lug on a wheel on the opposite side of the vehicle.

Although it is preferred to offset the leg 13, it is to be understood that this is not absolutely essential to the invention, and that the body may be formed with all portions in a common plane. In this latter case, only one lug may be required to accommodate any rotation or any wheel.

The traction lug of my invention, it will be appreciated, may be easily assembled with a vehicle wheel, regardless of the conditions of the surrounding terrain. Once the traction lug engages the terrain, the locking power holding the lug to the wheel is in direct proportion to the torque applied. Stated differently, the more power required to lift the vehicle out of its position, the greater is the locking action.

From the foregoing, it will be apparent to those skilled in the art that I have accomplished at least the principal object of my invention, and it also will be apparent to those skilled in the art that the embodiment herein disclosed may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A traction lug for a vehicle wheel, said lug having an opening providing surfaces spaced-apart a greater distance than a radial distance between spaced inner and outer peripheral surfaces of said wheel so that said lug may be freely assembled with said wheel transversely thereof and may tilt to binding engagement with said inner and outer peripheral surfaces.

2. A traction lug for a vehicle wheel having a drop-center rim and a tire mounted thereon, said lug being of generally U-shape to provide legs which are spaced-apart a distance greater than a radial distance between the bead-receiving portion of said rim and the tread surface of said tire so that said lug may be freely assembled with said wheel transversely thereof and may tilt to binding engagement with said bead-receiving portion and said tread surface.

3. A traction lug for a vehicle wheel having a drop-center rim and a tire mounted thereon, said lug being generally U-shape to provide legs which are spaced-apart a distance greater than a radial distance between the bead-receiving portion of said rim and the tread surface of said tire so that said lug may be freely assembled with said wheel transversely thereof and may tilt to binding engagement with said bead-receiving portion and said tread surface, the leg engageable with said tread surface having greater mass than the other leg to facilitate tilting action.

HUMBERT R. ROGANT.

REFERENCES CITED

The following references are of record in the file of this patent:

UNITED STATES PATENTS

| Number | Name | Date |
|---|---|---|
| 1,540,470 | Hayden | June 2, 1925 |
| 1,869,298 | Borgstrom | July 26, 1932 |